June 23, 1959  C. W. MACKEY  2,891,565
ANTI-SIPHON DEVICE FOR VALVES
Filed Jan. 18, 1957
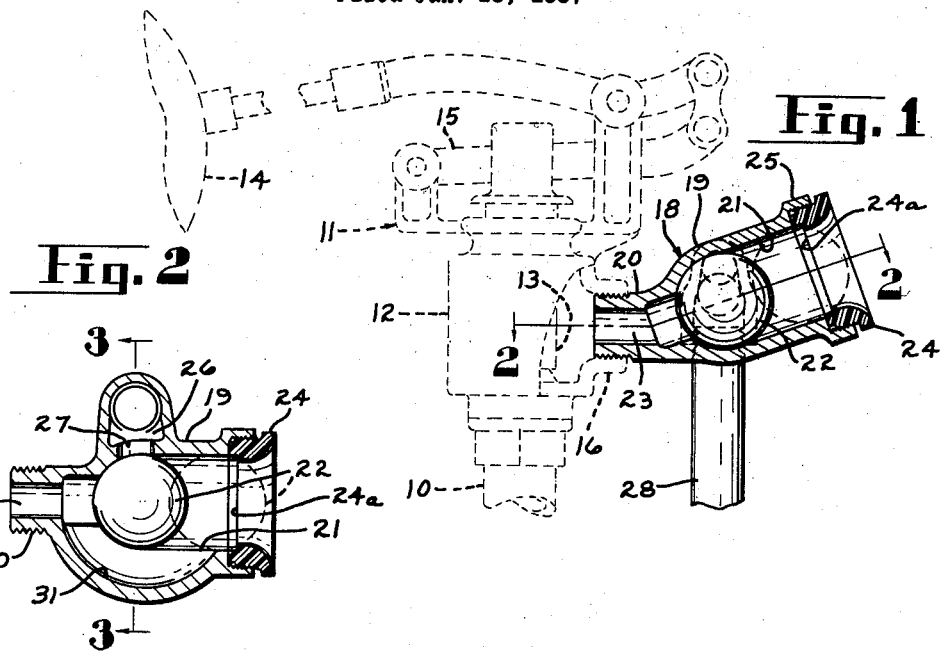
Fig. 1
Fig. 2
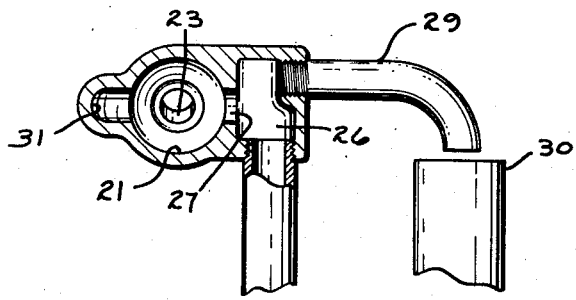
Fig. 3
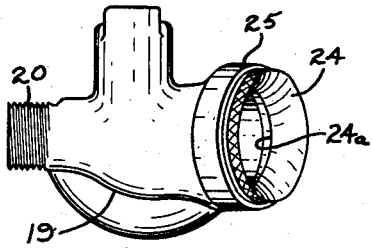
Fig. 4
INVENTOR
Charles W. Mackey
BY
H. F. Johnston
ATTORNEY

United States Patent Office 2,891,565
Patented June 23, 1959

2,891,565

ANTI-SIPHON DEVICE FOR VALVES

Charles W. Mackey, Cheshire, Conn., assignor to Scovill Manufacturing Company, Waterbury, Conn., a corporation of Connecticut Application January 18, 1957, Serial No. 634,870

1 Claim. (Cl. 137—217)

This invention relates to an improved anti-siphon device. It is important in the installation of certain plumbing fixtures, especially waterclosets, to insure against possible contamination of the water supply if there should be a pressure failure creating a suction on the inlet to such fixtures. Various types of anti-siphon devices or vacuum breakers have been interposed between the ballcock valve and the hush tube in a watercloset, but they have not been completely satisfactory for a variety of reasons.

In general, the object of my invention is to provide an improved anti-siphon device which will overcome the disadvantages of all such prior devices. More specifically, one object is to provide an anti-siphon device which will effectively restrict communication between the outlet side or hush-tube and the supply side or inlet immediately when the inlet pressure fails. In some earlier devices intended for this purpose, a sudden severe suction would permit some water to flow back through the hush tube before the vacuum could be broken.

Another object is to avoid any substantial leakage or splashing when water pressure is first applied to the device.

From the standpoint of economy of manufacture my invention aims to avoid a large number of parts or any complicated coring in the making of the valve body.

A preferred embodiment of the invention is illustrated in the accompanying drawing, in which:

Fig. 1 is a vertical cross-sectional view of an anti-siphon unit embodying my invention as it appears attached to a ball cock valve shown in dotted outline.

Fig. 2 is a horizontal sectional view of the unit taken along the line 2—2 of Fig. 1.

Fig. 3 is a transverse sectional view taken along the line 3—3 of Fig. 2, and

Fig. 4 is a top plan view of the anti-siphon unit.

In the embodiment of my invention illustrated, the numeral 10 represents a supply pipe which is connected to a suitable source of water and to the upper end of the supply pipe is connected a ball cock valve 11 having a casing 12. The ball cock valve 11 is provided with a piston type valve 13 under the control of a ball float 14 through suitable linkage mechanism 15. The ball cock valve 11 controls the flow of fluid to a storage tank (not shown), within which said valve 11 is located and from which tank there should be no back siphoning of the water into the supply system. The valve casing 12 is formed with an internally threaded outlet opening 16 at one side to which my anti-siphon valve unit 18 may be attached.

Specifically, this anti-siphon unit consists of a body 19 having an integral threaded nipple 20 adapted to be threaded into the opening 16 of the ball cock valve.

The valve body 19 is provided with a relatively large cylindrical chamber 21 within which is received a ball valve 22, preferably made of non-floating plastic material. The chamber 21 communicates with the ball cock valve through the inlet passage 23. The axis of the chamber 21 is disposed on an upward angle of substantially 20° to the axis of the nipple 20, for reasons as will appear later. The lower or inlet end of the chamber 21 is shaped to conform to the surface of the ball valve 22, and said valve is confined within said chamber 21 by a ring bushing 24 threaded into the enlarged open end 25 of the body 19. The ring bushing 24 is shaped to provide a seat 24a for the ball valve 22.

A discharge chamber 26 is disposed to one side of the main chamber 21 and connected thereto by an outlet port 27. A discharge pipe 28 connects to the lower side of the chamber 26 and leads to the base of the storage tank and is usually referred to as the hush tube. The usual refill tube 29 leads from the discharge chamber 26, to the overflow pipe 30 of the flush tank.

From Fig. 2 it will be noted that the outlet port 27 is adjacent the inlet end of the chamber 21 so as to be substantially closed off by the ball valve 22 when the latter is in its normal lower-most position in said chamber. Also an arcuate bypass passageway 31 circumvents the ball valve 22 and leads from the inlet passage 23 to the upper open end of the main chamber 21. The bypass 31 is preferably on the side of the chamber 21 opposite the outlet port 27.

In the operation of my anti-siphon unit when the ball cock valve 11 is open, water will be directed through the inlet passage 23, impinge against the ball valve 22 and force it upwardly in the main chamber 21 to a stop position against the valve seat 24a in the ring bushing 24, as shown by dotted lines in Figs. 1 and 2. The ball 22 has almost as large a diameter as the cylindrical chamber 21, the clearance being of the order of 5 thousandths of an inch. It may be described as "freely fitting" or having a "freefit." When water first enters the chamber 21 there is thus no opportunity for much of it to get around the ball until it is seated. This avoids any objectionable splashing of water from the open end of the unit. The water will then flow freely into the discharge chamber 26 and from there into the hush tube 28, and the smaller pipe 29 leading to the overflow tube 30. As soon as the ball cock valve 11 is closed, the ball valve 22 will roll back to its normal or lower position. If perchance any vacuum or suction should occur in the supply pipe during the time the ball cock valve is open, the ball valve 22 for lack of water support will immediately roll down the inclined chamber 21 uncovering the opening in the ring bushing 24 and allow an ample flow of air to freely circumvent the ball valve through the arcuate passageway 31 and thus preventing a back siphonage of water from the discharge pipe 28.

At that same time the outlet port 27 is restricted by the ball 22 to a degree which will prevent any water to be sucked up through the hush tube even though the vacuum is applied suddenly.

The advantages of my improved construction from the standpoint of economy of manufacture will be apparent to those skilled in the art. Besides the ball and valve seat ring, it consists of only one part which can be easily cast since no complicated corings are involved.

I claim:

An anti-siphon device comprising a valve body having a hollow nipple at one end for attaching the body to a water supply unit so that said nipple is on a horizontal axis, a cylindrical chamber disposed on an axis inclined upwardly from the axis of said nipple, said chamber having an inlet adjacent said nipple and being open at its opposite end, the end of said chamber around said inlet being spherically shaped, a valve seat provided at the open end of said chamber, a ball valve having a free fit in said chamber and normally seated against said spherical shaped end and adapted to be moved in said chamber into seating engagement with said valve seat by the force of water entering the inlet, a lateral outlet intercepting said chamber at its spherically shaped end in such position that it will be substantially covered by the ball when the ball is resting at the inlet end, and a by-pass passage located at one end of the chamber affording communication between said inlet and the open end of said chamber when the ball is resting against said spherically shaped end.

References Cited in the file of this patent

UNITED STATES PATENTS

| | | |
|---|---|---|
| 203,590 | Colborne | May 14, 1878 |
| 2,034,173 | Brooks | Mar. 17, 1936 |
| 2,252,078 | Kohlmeyer | Aug. 12, 1941 |
| 2,290,438 | Kohlmeyer | July 21, 1942 |
| 2,502,211 | Dyer | Mar. 28, 1950 |